Patented Feb. 9, 1932

1,844,129

UNITED STATES PATENT OFFICE

ALFRED T. LARSON, OF WILMINGTON, DELAWARE, ASSIGNOR, BY MESNE ASSIGNMENTS, TO E. I. DU PONT DE NEMOURS & COMPANY, OF WILMINGTON, DELAWARE, A CORPORATION OF DELAWARE

PRODUCTION OF METHANOL AND OTHER CARBON COMPOUNDS AND CATALYTIC AGENTS FOR USE THEREIN

No Drawing.    Application filed April 14, 1927.  Serial No. 183,905.

This invention relates to chemical reactions in the gaseous phase, and particularly to the production of oxygenated hydrocarbons by catalysis from gaseous mixtures, as described in my copending application Ser. No. 30,361, filed May 14, 1925, of which the present application is a continuation in part.

It is known that oxygenated hydrocarbons, and particularly methanol and its homologues, may be prepared synthetically by passing a gaseous mixture containing carbon monoxide and hydrogen under pressure over a catalyst. The synthesis depends upon reactions of which the following for methanol is characteristic:

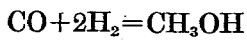

$$CO + 2H_2 = CH_3OH$$

It is the object of the present invention to provide an improved process of effecting reactions in the gaseous phase, especially the synthesis of oxygenated hydrocarbons such as methanol, and improved catalysts of superior activity and efficiency in such reactions. Other objects and advantages will be apparent as the invention is more fully understood by reference to the following specification in which its preferred embodiments are described.

In carrying out catalytic reactions in the gaseous phase it is desirable that the catalyst containing space be as small as possible, especially when the reaction is to be effected under high pressure. The higher the pressure, the more acute is the problem of strength of the wall of the reaction apparatus and this strength is more and more difficult to maintain as the diameter of the catalyst container is increased. Also, because of the generally high cost of equipment for high pressure work it is necessary to keep the size of the catalyst space at a minimum. These considerations indicate the importance of selecting as a catalyst a material having the highest possible activity per unit volume.

I have discovered that the efficiency of reactions in the gaseous phase can be improved by employing certain improved catalysts. The catalysts which I use are prepared by fusing and subsequently reducing a mixture of copper oxide and one or more of the oxides of the group of elements manganese, tungsten, zinc, cadmium and molybdenum.

The catalysts herein described are characterized by an activity distinctly superior to that exhibited by any of the above-named elements alone, or by mixtures of them prepared by co-precipitation or trituration of the oxides or by catalysts prepared by fusing the oxides without the inclusion of copper oxide. The term "superior activity" is used to indicate that with a given rate of gas flow the catalysts give a higher yield of product per hour or, in other words, to attain a given hourly production a lower rate of gas flow may be maintained. The degree of activity which characterizes the new catalysts could not have been predicted upon the basis of any prior knowledge and is particularly surprising in view of the relative inactivity of copper per se as a catalyst for many reactions of the type described. For example, in the synthesis of oxygenated hydrocarbons from carbon monoxide and hydrogen pure copper gives, under even the most favorable conditions, but insignificant quantities of oxygenated hydrocarbons.

The improved catalysts are also superior in physical form in that they are harder and more coherent than known catalysts. As the result of their greater ruggedness there is less disintegration in handling and using the catalysts than in the case of more friable catalysts, which disintegrate during use and may cause serious stoppages of the gas conduits because a portion of the catalyst is carried away by the gaseous stream. From the standpoint of cost and reproducibility of results the catalysts of the invention are highly desirable. For experience has shown that catalysts can be made much more cheaply by the method described than by precipitation methods. Moreover, it is possible to duplicate any one catalyst as to composition and activity quite readily, whereas with precipitated catalysts the composition, particle size and form, and hence the activity, are practically impossible of exact control.

In carrying out the invention the prepared catalyst is disposed in a suitable receptacle adapted to withstand the pressure at which the reaction is conducted. The gaseous mixture is introduced at the proper temperature which may be regulated and maintained in any desired way. The gaseous mixture containing the product of the reaction is withdrawn and cooled to effect condensation of the product or is treated otherwise for the recovery thereof.

The catalysts are particularly well adapted for the synthesis of methanol from gaseous mixtures containing hydrogen and carbon monoxide. This reaction may be conducted with the described catalysts at various pressures and temperatures, but I prefer to carry out the synthesis of methanol at a pressure within the range of 400 to 1000 atmospheres and at a temperature of 250° to 500° C. The usefulness of the catalysts is not limited to the treatment of gaseous mixtures of any particular composition, it being possible to effect the synthesis of methanol, for example, with the improved catalysts by introducing gaseous mixtures containing hydrogen and carbon monoxide in which the proportion of the latter is relatively low, for example, between 3 and 15%. If the gaseous mixtures contain relatively higher proportions of carbon monoxide the reaction proceeds more vigorously, greater quantities of heat are evolved and corresponding provision must be made, therefore, for the dissipation of the heat so that the catalyst may not be damaged by overheating and undesirable side reactions, such as methanation, may be avoided.

The following examples will serve to indicate the preferred procedure in preparing and utilizing catalysts such as are described herein, it being understood, however, that the invention is not limited to the details of operation or the particular conditions as set forth.

*Example 1.*—Prepare an intimate mixture of ten to eleven parts of pure cupric oxide and one and one-half to three parts of pure manganese dioxide. The mixture is fused, allowed to cool and crushed to suitable size. The crushed material is then reduced slowly at 150° to 350° C. and at atmospheric pressure in a current of pure hydrogen. Since the reduction process is exothermic it is necessary that it be carried out slowly and with care so that the catalyst may not be damaged by excessive temperature. The catalyst thus prepared may be employed for the production of methanol by passing a gaseous mixture containing hydrogen and carbon monoxide in the volume ratio of twenty to one at a space velocity of 100,000 to 150,000, a pressure of 900 atmospheres and while maintaining a temperature within the range of 250° to 400° C. The principal product is methanol, which is associated with some of its higher homologues.

*Example 2.*—An intimate mixture comprising ninety parts of pure cupric oxide and ten parts of pure zinc oxide is fused, allowed to cool and crushed and screened to suitable size. The crushed material is reduced slowly and carefully with pure hydrogen at atmospheric pressure and at a temperature within the range of 150° to 350° C. This catalyst can be used likewise for the production of methanol by passing a gaseous mixture containing hydrogen and carbon monoxide under a pressure of 400 atmospheres over the catalyst at a space velocity of 100,000 to 150,000 while the temperature is maintained between 300° and 400° C.

Other catalysts, including the elements hereinbefore mentioned in combination with copper, can be prepared similarly and utilized for the production of methanol and for conducting other reactions in the gaseous phase in a similar manner under conditions of pressure and temperature that may vary within a wide range, depending upon the particular nature of the desired reaction and of the product to be prepared. A catalyst containing two or more of the elements mentioned in combination with copper can be prepared similarly by combining the oxides of these elements. Such combined catalysts have the desirable characteristics hereinbefore mentioned and may be utilized in effecting various reactions in the gaseous phase including the production of oxygenated hydrocarbons such as methanol.

It is to be understood that while the gaseous mixtures employed need not be limited to those containing hydrogen and carbon monoxide exclusively, the gases should, nevertheless, be freed from impurities which are likely to deleteriously affect the catalyst, and of these the compounds of sulphur are the most commonly encountered. The sulphur compounds may be removed preliminarily from the gases by suitable treatment thereof in accordance with the well understood practice. In synthesizing methanol and the like, it is recommended that suitable precautions be taken for avoiding the presence of metals of the iron group (iron, nickel and cobalt) in the catalyst and in the gases that are to react.

I have no theory or explanation to offer for any changes which may occur in the composition of the catalysts during either their reduction or actual use. It may be that in some cases the reduction yields a lower and especially active oxide which in conjunction with the activated copper with which it is associated forms a mass peculiarly adapted for the catalytic production of oxygenated hydrocarbons. In any event, it is to be understood that the term catalyst as employed in the claims includes the contact mass in the form in which it is prepared originally as well as in any modified form in which it may occur during its use.

It will be apparent from the foregoing that by providing new catalysts of superior activity and improved physical form, decreasing catalyst consumption and improving smoothness of operation, and by thus facilitating the production of oxygenated hydrocarbons and other desirable products of synthetic and other reactions, the present invention represents a distinct advance in the art. While the invention has been described more particularly with reference to the synthesis of methanol, the improved catalysts and the process may be utilized with similar advantages in conducting other reactions in the gaseous phase.

The various details of apparatus and procedure may be modified to meet the particular conditions of the reaction, the products being recovered in any suitable or desirable way, it being possible, for example, at pressures above 200 atmospheres to practically completely condense methanol from the gases by cooling with water at ordinary temperature. The methanol can be separated otherwise and other products can be treated in the manner best adapted to effect the separation thereof in an economical and satisfactory way.

Various changes may be made in the details of operation hereinbefore described without departing from the invention or sacrificing any of the advantages thereof.

I claim:—

1. The process of manufacturing oxygenated hydrocarbons, which comprises passing a gaseous mixture containing carbon monoxide and hydrogen over a heated catalyst consisting of the reduction product of a fused mixture of copper oxide and an oxide of one of the elements of the group manganese, tungsten, zinc, cadmium and molybdenum.

2. The process of manufacturing oxygenated hydrocarbons, which comprises passing a gaseous mixture containing carbon monoxide and hydrogen over a heated catalyst consisting of the reduction product of a fused mixture of copper oxide and manganese oxide.

3. The process of manufacturing methanol, which comprises passing a gaseous mixture containing carbon monoxide and hydrogen over a heated catalyst consisting of the reduction product of a fused mixture of copper oxide and an oxide of one of the elements of the group manganese, tungsten, zinc, cadmium and molybdenum, the temperature of said catalyst being within the range of 250° to 500° C.

4. The process of manufacturing methanol, which comprises passing a gaseous mixture containing carbon monoxide and hydrogen over a heated catalyst consisting of the reduction product of a fused mixture of copper oxide and manganese oxide, the temperature of said catalyst being within the range of 250° to 500° C.

5. The process of manufacturing oxygenated hydrocarbons, which comprises passing a gaseous mixture containing carbon monoxide and hydrogen, at a pressure within the range of 400 to 1000 atmospheres, over a heated catalyst consisting of the reduction product of a fused mixture of copper oxide and an oxide of one of the elements of the group manganese, tungsten, zinc, cadmium and molybdenum.

6. The process of manufacturing oxygenated hydrocarbons, which comprises passing a gaseous mixture containing carbon monoxide and hydrogen, at a pressure within the range of 400 to 1000 atmospheres, over a heated catalyst consisting of the reduction product of a fused mixture of copper oxide and manganese oxide.

7. The process of manufacturing methanol, which comprises passing a gaseous mixture containing carbon monoxide and hydrogen, at a pressure within the range of 400 to 1000 atmospheres and a temperature between 250° and 500° C., over a heated catalyst consisting of the reduction product of a fused mixture of copper oxide and an oxide of one of the elements of the group manganese, tungsten, zinc, cadmium and molybdenum.

8. The process of manufacturing methanol, which comprises passing a gaseous mixture containing carbon monoxide and hydrogen, at a pressure within the range of 400 to 1000 atmospheres and a temperature between 250° and 500° C., over a heated catalyst consisting of the reduction product of a fused mixture of copper oxide and manganese oxide, In testimony whereof I affix my signature.

ALFRED T. LARSON.